Jan. 20, 1970  O. R. NEMETH ET AL  3,490,835
AUTOMATIC FILM EXPOSURE SYSTEM FOR MOTION PICTURE CAMERAS
Filed Sept. 20, 1966

INVENTORS
OTTO R. NEMETH
ROBERT D. AUGUSTE
BY
Elliott & Pastoriza
ATTORNEYS

United States Patent Office 3,490,835
Patented Jan. 20, 1970

3,490,835
AUTOMATIC FILM EXPOSURE SYSTEM FOR MOTION PICTURE CAMERAS
Otto R. Nemeth, Los Angeles, and Robert Auguste, Granada Hills, Calif., assignors to Photo Electronics Corporation, a corporation of California
Filed Sept. 20, 1966, Ser. No. 580,810
Int. Cl. G03b 7/08, 9/10
U.S. Cl. 352—141                 8 Claims

ABSTRACT OF THE DISCLOSURE

A motion picture camera is provided with an automatic light exposure system in which the degree of overlapping of sector shaped openings in first and second discs comprising the shutter for the camera is varied to vary the amount of light reaching the film when each frame is taken. The relative position of one disc with respect to the other in the shutter for controlling the degree of overlapping and thus the amount of light reaching the film is controlled by movement of a physical member coupled to a solenoid, the degree of movement being a function of the signal strength applied to the solenoid. This signal strength is responsive, at least in part, to a sensing signal derived from photo-sensitive elements fixed to the camera and in turn responsive to the brightness of the scene being photographed.

---

This invention relates to an automatic exposure system for adjusting the light exposure of a film in accordance with varying light conditions and more particularly, to an improved automatic exposure system for use with motion picture cameras.

There are many instances in the taking of motion pictures when the particular scenes to be photographed are unpredictable insofar as light conditions are concerned. For example, in aerial photography, particularly under combat conditions, it is ordinarily not possible to continuously adjust the light exposure components of a motion picture camera and still record the desired action. Particular problems are involved since the horizon constitutes a dividing line between relatively bright lighting conditions and relatively dark lighting conditions. Movement of the camera from objects above the horizon to objects below the horizon results in a rapid and large change in lighting conditions. In addition, in recording the performance of rockets or missiles carrying warheads, the explosion of the missile itself can constitute a bright burst of light in a dark background and in the absence of properly designed exposure control means, the film can become improperly exposed.

In view of the foregoing problems, it is almost mandatory that automatic exposure means for continuously varying the exposure setting of the camera be incorporated. Such systems as have been provided to date normally include electric motors in the camera itself responsive to photocell signals to drive suitable coupling gears between the shaft of the motor and the shutter mechanism of the camera or other mechanism for adjusting the light permitted to reach the film. Such systems have proven satisfactory for normal motion picture photography but under many conditions in which "live" news events or unpredictable phenomenon are taking place, particularly in the aforementioned environment of aerial photography, these systems have not been satisfactory.

Primary among the various problems involved is the relatively slow response time of the light adjusting means to a change in the lighting condition. This slow response time is a consequence of the inertia of the motor and gears. It can be appreciated that the slow response time renders the exposure mechanism ineffective when a rapid change in light conditions occur, such as, for example, when a bomb explodes. Other problems arise in the form of wear and backlash in the gears necessitating careful maintenance and recalibration of the light exposure adjusting means at periodic intervals.

With the foregoing considerations in mind, it is a primary object of this invention to provide a vastly improved automatic film exposure system for motion picture cameras in which the above problems substantially are overcome.

More particularly, it is an object to provide an automatic exposure system for a movie camera which has a response time of the order of thirty to fifty times faster than that characterizing presently available equipment.

Another important object is to provide an automatic exposure system which avoids the use of a motor and conventional coupling gears to the end that problems associated with inertia of the motor and wearing and backlash of the associated gears are avoided.

Other important objects are to provide an automatic light exposure system for a motion picture camera which is more efficient in operation thus requiring less battery power to increase its life, and less maintenance than certain types of known automatic exposure systems.

Briefly, these and many other objects and advantages of this invention are attained by providing a photoelectric means preferably in the form of one or more photo resistance cells positioned to provide a sensing signal constituting a function of the intensity of light passing to a film in the camera. In accord with one feature of this invention, the photo sensitive elements are positioned behind the lens of the camera relatively close to the film itself such that the photo resistance elements are exposed to the image produced by the lens. With this arrangement, the actual sensing signal is a more accurate function of the amount of light passing to the film and ambient light conditions not encompassed within the aperture of the camera will not result in spurious sensing signals.

In accord with another important feature of this invention, the use of a motor and coupling gears is avoided and in place thereof there is provided a solenoid actuator arranged to be energized by a control signal responsive to the sensing signal. A change in the sensing signal in response to a change in light intensity results in substantially immediate actuation of the solenoid actuator to move a suitable push rod type member provided for physically changing the shutter or equivalent elements in the camera to thereby vary the light passing to the film. By this arrangement, there is avoided inertia problems associated with a motor as well as backlash and wear of various gears in a gear train coupling the motor to the push rod member. More importantly, the novel incorporation of a solenoid type actuator provides a considerably faster response time all to the end that the various objects of the present invention can be realized.

A better understanding of the invention as well as further features and advantages thereof will be had by now referring to a preferred embodiment as illustrated in the accompanying drawings, in which.

Figure 1:
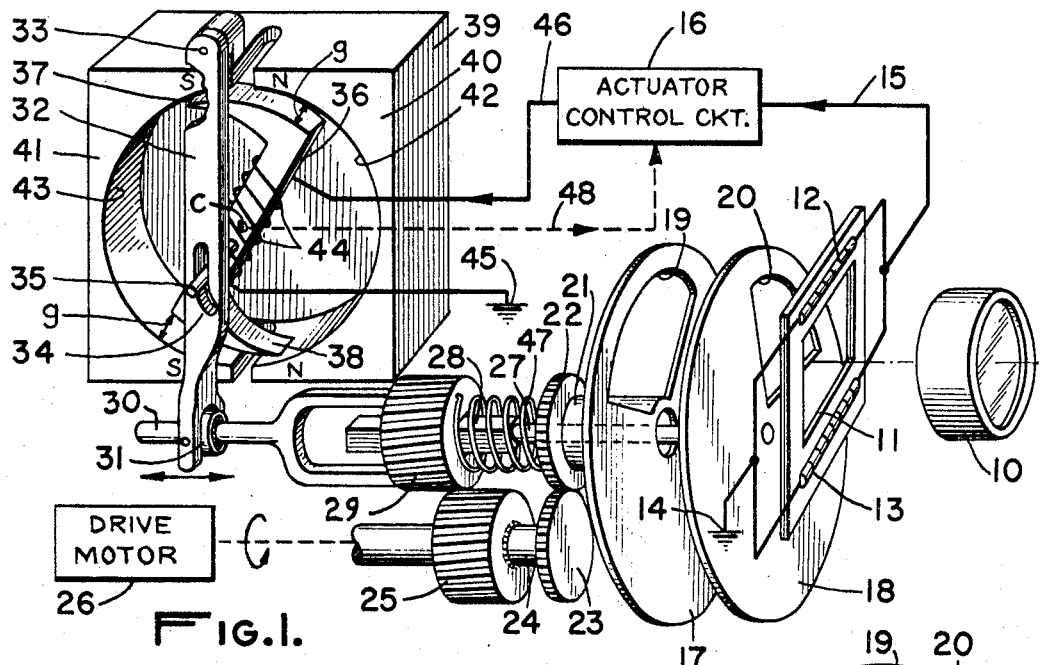
FIGURE 1 is a perspective view partly exploded and partly schematic illustrating the basic components making up the automatic exposure system as incorporated in a motion picture camera.

Referring first to the right hand portion of FIGURE 1, there is schematically illustrated a lens 10 for a motion picture camera including an aperture opening 11 for receiving light from the lens 10 and passing the same to a film (not shown). Positioned above and below the aperture opening 11 are photo sensitive resistance elements 12 and 13 connected in parallel and grounded at one end as indicated at 14 and having their other ends connected to a common lead 15 to an actuator control circuit 16. Shutter discs 17 and 18 for the motion picture camera are disposed behind the aperture 11 and respectively include cut out sections 19 and 20 in overlapping relationship.

The shutter discs 17 and 18 are shown separated in order to clearly illustrate each disc. It should be understood that they are normally disposed immediately adjacent each other so that the overlapping portions of the open sectors 19 and 20 define a single variable sized opening.

The shutter disc 17 is mounted for rotation by a shaft 21 through the medium of spur gear 22 and spur gear 23 secured to a shaft 24. The shaft 24, as shown, mounts a first helical type gear 25 and is arranged to be rotated by the conventional motion picture camera drive motor 26. This drive motor also operates the usual pull down claw mechanism, film drive, and so forth.

The second shutter disc 18 is secured to a shaft 27 coaxially passing within the shaft 21 and including a noncircular or square cross-sectional portion 28. A second helical gear 29 is locked for rotation with the square portion of the shaft 28 but is free to move longitudinally back and forth as indicated by the double headed arrow. The helical gear 29 is in engagement with helical gear 25.

It will be clear from the arrangement described thus far that rotation of the shaft 24 by the drive motor 26 will result in rotation of the helical gear 29 to rotate the shaft 28 and thus the shutter disc 18 will be rotated simultaneously with rotation of the shutter disc 17 through the gears 23, 22, and shaft 21. The two shutter discs will thus rotate together at a required speed depending upon the number of frames of motion picture film to be exposed per second.

Figure 2:
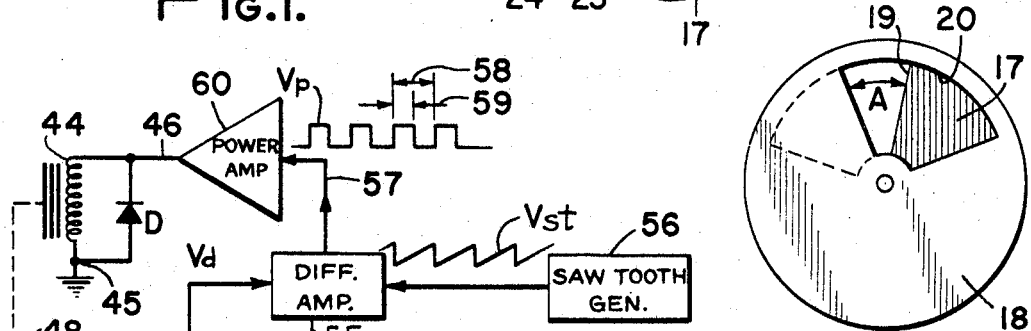
FIGURE 2 is a front elevational view of the shutter of the motion picture camera in FIGURE 1; and, FIGURE 3 is a schematic diagram, partly block in form, of an electrical portion of the system illustrated in FIGURE 1 useful in explaining the operation of the invention.

With reference to FIGURE 2, it will be noted that the overlapping portions of the open sectors 19 and 20 in the respective shutter discs defines a variable sized opening. In other words, by changing the relative position of the disc 18 with respect to the disc 17, the degree of overlap may be changed and thus vary the size of the common opening through the shutter discs. This variation in the degree of overlap by shifting one disc relative to the other is accomplished by the helical gear 29 cooperating with the helical gear 25.

Thus, referring again to FIGURE 1, the helical gear 29 is secured to a push rod member 30 in turn mounted in a suitable bearing support 31. Movement of the push rod in a forward direction or to the right, will result in the helical teeth of the gears 29 and 25 causing a change in the relative positioning between the discs 17 and 18 to thereby vary the size of the opening defined by the overlapping sectors 19 and 20. In the particular embodiment illustrated, the design is such that a forward movement of the push rod member 30 and helical gear 29, that is, to the right, will result in a decreased overlap so that the common opening will be decreased in size. Similarly, movement of the push rod member 30 and helical gear 29 to the left will result in increased overlapping of the open sectors and thus an increase in the size of the opening through the shutter discs.

The back and forth motion of the helical gear 29 and push rod 30 is under control of an actuator means including a lever 32 supporting the bearing 31 at its lower end. As shown, the lever 32 is pivoted at its upper end at 33 for small arcuate swinging movement. The movement is sufficiently small that the push rod 30 is capable of substantially linear movement for small swinging movements of the lever 32 without any binding taking place in the bearing support 31.

The lever 32 is arranged to be moved through the medium of a cam follower slot 34 formed in the lever cooperating with a cam pin 35 secured to an armature 36 constituting part of a solenoid actuator. This armature, as shown, is centrally mounted for rotation at C and includes radially extending portions terminating in first and second pole faces 37 and 38 disposed within a permanent magnet structure 39 defining north and south poles 40 and 41. Essentially, the permanent magnet 39 constitutes a horseshoe type or U shaped magnet when viewed from above in plan with the right hand portion constituting the north pole and the left hand portion constituting the south pole. These respective poles are recessed out as at 42 and 43 to define a circular cavity.

The pole surfaces defined at 42 and 43 are circular and thus of a constant radial distance from the center of rotation C of the armature 36. The respective pole faces 37 and 38 of the armature however have their surfaces of increasing radial distance from the center of rotation towards their extreme tips such as to provide a wedge shaped or tapered air gap $g$. With this arrangement, and the armature 36 polarized when not energized such that its upper pole face 37 constitutes a south pole and its lower pole face 38 constitutes a north pole, the armature will be biased to rotate in a clockwise direction in order to minimize the air gap $g$.

Still referring to the armature 36, there is provided an energizing winding 44 having one end grounded as at 45 and its other end connected to the actuator control circuit 16 as indicated at 46. When the winding 44 is energized by a control signal from the actuator control circuit 16 through the lead 46, the direction of current flow is such that the pole face 37 becomes a north pole and the pole face 38 becomes a south pole so that the armature is caused to rotate in a counterclockwise direction. This rotational movement is transferred through the camming pin 35, cam follower slot structure 34, and the lever 32 to the push rod member 30 and thus to the helical gear 29. A compression spring 47 bearing against the helical gear in opposition to its forward movement results in the gear assuming a position in accord with the strength of the signal in the armature winding.

The shaping of the cam follower slot 34 in conjunction with the lever arrangement is such that the armature angular motion, when transferred to a substantially linear motion of the push rod 30, defines a suitable function for controlling the exposure provided by the overlapping open sections of the shutters with reference to the strength of the control signal applied to the winding.

Upon a decrease in the signal in the winding 44, the armature 36 will rotate in a clockwise direction as a consequence of the reverse bias by the spring 47.

With the foregoing brief description of the components illustrated in FIGURE 1 in mind, the general operation of the automatic exposure means will be described. Assume that the operator is taking motion pictures of a given scene. Light passing through the lens is detected by the photo resistive cells 12 and 13 to define a sensing signal in the actuator control circuit 16 through the lead 15. This sensing signal is linearized and suitably amplified in the actuator control circuit to provide a control signal on the lead 46 to energize the winding 44 for the armature 36 thereby causing the armature 36 to assume a given angular position constituting a function of the magnitude of the control signal.

If now an increase in the light from the given scene occurs, the resulting change in the sensing signal and control signal will result in a rotation of the armature further in a counterclockwise direction to a new position of equilibrium with the bias afforded by spring 47. This rotary movement of the armature 36 is imparted to the lever 32 through the pin and slot arrangement to swing the lever 32 in a counterclockwise direction about its pivot point 33 such that the push rod 30 is urged to the right as viewed in FIGURE 1. This movement of the push rod 30 to the right moves the helical gear 29 to the right resulting in a rotation of shutter disc 18 in a clockwise direction as viewed in FIGURE 2 to thereby lessen the degree of overlap of the open sectors 19 and 20 between the shutter discs. As a consequence, the common opening angle A as illustrated in FIGURE 2 is decreased in size so that the amount of light reaching the film is decreased.

If the light from the scene should decrease or the scene become suddenly darkened, the change in the sensing signal in lead 15 detected by the photo resistive elements 12 and 13 will result in a control signal of less magnitude reaching the coil 44 for the armature 36 thereby resulting in a clockwise rotation of the armature 36 from its former position and thus a permitting of the push rod 30 to move to the left as a consequence of the compression spring 47 and thereby move the helical gear 29 to the left. This motion results in rotation of the disc 18 in a counterclockwise direction as viewed in FIGURE 2 to increase the size of the opening defined by the overlapping sectors of the shutter discs thereby increasing the angle A. Thus, more light can now reach the film.

It should, of course, be understood that during operation of the motion picture camera, the winding 44 is continuously energized, the signal entering the winding varying in magnitude in accordance with the varying light conditions so that a continuous automatic adjustment of the light permitted to reach the film is realized.

Figure 3:
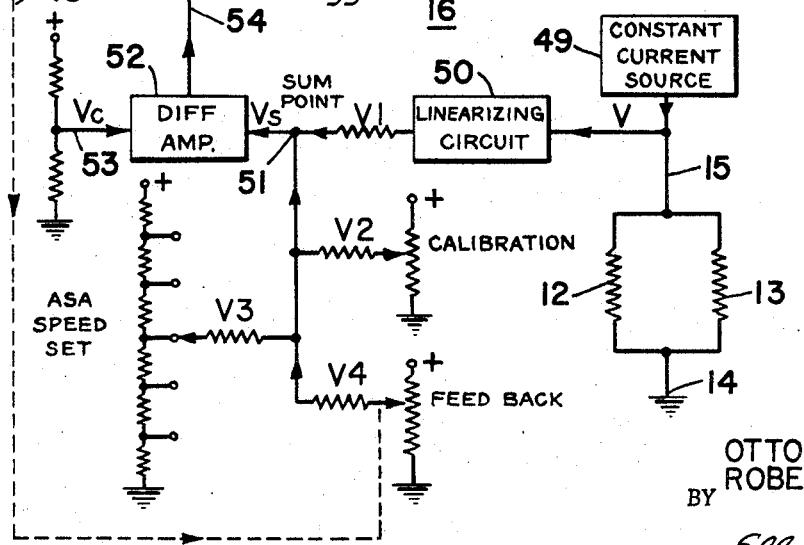

Referring now to FIGURE 3, one form of preferred actuator control circuit such as might be embodied in the actuator control circuit 16 of FIGURE 1 is illustrated. Certain of the components in FIGURE 1 have been indicated in FIGURE 3 by their equivalent electrical symbol and are designated by the same numerals.

Referring first to the right hand portion of FIGURE 3, the photo resistance cells 12 and 13 are shown as simple resistances which vary in value in accordance with the incident light thereon. A constant current source 49 passes current through the resistances 12 and 13 to ground 14 continuously so that a given voltage V will appear in the lead 15. The characteristic of the photo resistance cells 12 and 13 is such that for more light incident on the cells, a decrease in their resistance takes place. Thus, for an increase of light from the scene being photographed, there will result a decrease in the resistances 12 and 13 and thus a decrease in the voltage V in the line 15.

This voltage signal V is passed through a linearizing circuit 50 resulting in a linearized signal V1 at a junction point 51.

The junction point 51 serves as a summing junction point at which other signals may be added to the signal V1. For example, a suitable signal for calibrating the system may be derived from a calibration resistance and is indicated by a voltage V2. A further signal to take into account the standard speed rating of the film such as the ASA speed of the film may be derived from suitable taps on a resistance and is indicated by voltage V3. Finally, there is provided at the sum point 51 a feedback voltage V4 derived from a suitable resistance and tap arranged to be moved with movement of the armature 36 of FIGURE 1.

The sum of all of the various signals at the junction point 51 is indicated by a sum signal $V_s$ and is passed to one side of a first differential amplifier 52. A given voltage $V_c$ from a given voltage source in turn is applied to the other side of the differential amplifier at 53 and the difference output signal $V_d$ is passed to output lead 54. This difference signal is received in one side of a second differential amplifier 55, the other side of which receives a saw tooth voltage signal $V_{st}$ from a saw tooth generator 56. The output signal from the second differential amplifier 55 appears on lead 57 as a series of pulses $V_p$ having a period 58 and pulse width 59. These pulses are passed through a power amplifier 60 to provide the desired control signal on the lead 46 for the armature winding 44.

The differential amplifier 55 together with the saw tooth generator 56 and power amplifier 60 constitute a converting means which will provide the series of pulses $V_p$ at a high frequency, for example, somewhere between 400 and 1,000 cycles per second. The period 58 of the pulses corresponds to the period of the saw tooth generator 56. The width 59 of each pulse varies in accordance with the strength of the signal $V_d$ passed into the differential amplifier 55. The purpose for this type of converting means is to effect a maximum power transfer with minimum dissipation of the control signal in the form of heat thereby providing greatly increased efficiency in operation of the system.

Since the signal to the winding 44 is in the form of a series of pulses, there is provided a free wheeling diode D connected across the winding 44 which functions to effectively provide a steady flow of current in the winding 44, the magnitude of which will depend upon the pulse width of the various pulses $V_p$ passed into the power amplifier 60.

With the foregoing brief description of the various elements making up the electrical portion of the system in mind, its operation will now be described. It will be recalled from the description of FIGURE 1 that an increase in the signal in the winding 44 will result in a movement of the push rod 30 to the right in a manner to rotate the disc 18 relative to the disc 17 to thereby decrease the size of the overlapped openings between the two discs and thus cut down on the quantity of light passed to the film. Assuming again that the scene being photographed increases greatly in its lighting such that it is desirable to close down the exposure, this increased light intensity will result in a decrease in the resistance of the photo cells 12 and 13 in FIGURE 3. This decreased resistance in turn will result in a drop in the value of the voltage signal V passed to the linearizing circuit 50.

The sensing signal V may have a voltage value of from one fourth to twelve volts depending upon the intensity of light. This signal passes through the linearizing circuit 50 wherein the signal is linearized such that there is a 100% change in the signal for each "stop" or "f" opening in accord with standard rating systems. As an example, the linearized signal V1 would vary approximately one quarter of a volt per stop. The sum signal $V_s$ after receiving suitable calibrating, ASA speed set, and feedback signals summed at the junction 51 may have a value of the order of two and three fourths volts to five volts, this voltage decreasing with increasing light.

The given voltage $V_c$ passed to the other side of the differential amplifier 52 may be of the order of four volts so that the difference voltage signal $V_d$ from the differential amplifier, after amplification, may have a value of from 8 to 14 volts. Because of the operation of the differential amplifier 52, the signal $V_d$ will increase when the signal $V_s$ decreases. Similarly, the series of pulses $V_p$ will have an increase in their width with an increase in the signal $V_d$ feeding into the differential amplifier 55, so that the control signal on the lead 46 from the power amplifier 60, which is passed to the winding 44, will increase with increasing light conditions.

As described in conjunction with FIGURE 1, the increase of the signal in the armature winding will result in a further rotation of the armature 36 in a counterclockwise direction to thereby move the push rod 30 to the right resulting in rotation of the shutter disc 18 in a clockwise direction to close down the opening and thus decrease the angle A of this opening.

Upon movement of the armature 36 to effect the foregoing closing down of the common opening of the shutters, the feedback tap providing the feedback signal V4 of FIGURE 3 will move in a direction to result in a decrease of the signal Vs to compensate for the increase in the sensing signal from the cells 12 and 13 as a result of closing down of the shutter opening so that essentially the signal from the differential amplifier 52 is maintained at its new value in accord with the new light conditions. Thus, the armature 36 will remain at its new position there being no further change in the signal to the winding 44 until another change in light intensity occurs.

In the event that the light from the scene being photographed should decrease, the resistance of the photo resistance elements 12 and 13 will increase resulting in an increased sensing signal V which in turn results in a decrease in the difference signal Vd from the differential amplifier 52. The series of pulses Vp thus decrease in pulse width so that the signal passing to the winding 44 decreases permitting the armature 36 to swing back in a clockwise direction as a consequence of the action of the spring 47 through the push rod mechanism 30 and lever 32. The movement of the helical gear 29 on the push rod 30 will again result in a change in the relative position of the shutters 17 and 18 in a direction to increase the common opening defined by the angle A in FIGURE 2 to permit more light to the film. This latter described movement of the armature 36 in a clockwise direction will move the feedback arm for the feedback voltage V4 in an opposite direction from that previously described so that the new sensing signal at the sum point 51 will be compensated for by the feedback voltage and the new control signal maintained at its new value.

From the foregoing description, it well be clear that continuous and automatic control of the quantity of light permitted to expose the film is carried out. Further, since the system is operated by a solenoid type actuator as described, there is a minimum of inertia and also no gear trains and the like are required to communicate the motion to the push rod 30 all to the end that wear and backlash are eliminated and a far more rapid response of the system to varying light conditions is realized.

In addition, the unique positioning of the photo resistance cells behind the lens so as to receive the light image avoids generation of spurious or undesirable signals by ambient light not constituting part of the scene. Also, however, a sudden bright spot in the center of the scene, will not appreciably affect the cells since they are disposed to the sides and thus, a scene will not be underexposed simply because of such a central light spot as might result from an exploding missile.

It will be evident accordingly that the present invention has provided an automatic exposure means in which all of the various objects set forth heretofore are fully realized.

What is claimed is:

1. A motion picture camera having an automatic film exposure system for adjusting the light exposure of film in said camera in accord with varying light conditions, comprising, in combination:
    (a) light responsive means for providing a sensing signal constituting a function of the intensity of light passing to said film;
    (b) a shutter means for said motion picture camera comprised of first and second discs each having sector shaped openings in overlapping relationship and coupled for continuous rotation together when said camera is taking motion pictures;
    (c) light exposure adjusting means for varying the rotative position of one of said discs relative to the other while both are rotating to thereby vary the degree of overlapping of said sector shaped openings and thus the light exposure of said film;
    (d) actuator means coupled to actuate said light exposure adjusting means in response to a control signal; and,
    (e) an actuator control circuit connected to receive said sensing signal and provide said control signal, said control signal constituting, at least in part, a function of said sensing signal, said actuator means comprising a solenoid actuator including a rotatably mounted armature having an armature winding connected to receive said control signal, said armature including pole faces; a permanent magnet structure having pole positioned in opposed relationship to said pole faces, the air gap between said pole faces and poles being tapered such that said armature is magnetically biased towards a first position in the absence of a control signal in its windings, said light exposure adjusting means including a physical member movable in forward and reverse directions to vary the rotative position of one of said discs relative to the other and thereby vary the light exposure of said film; and coupling means between said armature and member for imparting substantially linear movement to said member in response to rotary movement of said armature,
whereby a change in said sensing signal is response to a change in light intensity results in a change in said light exposure adjusting means to vary the light exposure of said film to compensate for change in light intensity.

2. A system according to claim 1, in which said actuator control circuit includes means for providing a calibrating signal so that said control signal constitutes a function in part of said calibrating signal.

3. A system according to claim 1, in which said actuator control circuit includes means for providing a signal constituting a function of a standard speed rating for said film so that said control signal constitutes a function in part of said speed rating.

4. A system according to claim 1, in which said actuator control circuit includes means for providing a feedback signal responsive to movement of said actuator means so that said control signal is maintained at a constant value by said feedback signal when said light exposure adjusting means has been actuated to effect proper compensation for said change in light intensity.

5. An automatic exposure system for adjusting the light exposure of a film in accordance with varying light conditions comprising, in combination: light responsive means for providing a sensing signal constituting a function of the intensity of light passing to said film; light exposure adjusting means to vary the light exposure of said film; acutator means coupled to actuate said light exposure adjusting means in response to said sensing signal; an actuator control circuit connected to receive said sensing signal and provide a control signal constituting, at least in part, a function of said sensing signal, said actuator means being connected to be actuated by said control signal, said actuator means comprising a solenoid actuator including a rotatably mounted armature having an armature winding connected to receive said control signal, said armature including pole faces; a permanent magnet structure having poles positioned in opposed relationship to said pole faces, the air gap between said pole faces and poles being tapered such that said armature is magnetically biased towards a first position in the absence of a control signal in its windings, said light exposure adjusting means including a physical member movable in forward and reverse directions to vary the light exposure of said film; and coupling means between said armature and member for imparting substantially linear movement to said member in response to rotary movement of said armature, said coupling means including a lever pivoted at one end to a stationary structure and coupled at its other end to said member, said lever including an elongated slot defining a cam follower means; and a camming pin eccentrically mounted to said armature passing through said slot so that rotative movement of said armature swings said lever through camming action of said pin in said slot to impart movement to said member, said slot being shaped to effect equal exposure stops by said light exposure adjusting means for equal signal strength changes in said control signal, whereby a change in said sensing signal in response to a change in light intensity results in a change in said light exposure adjusting means to vary the light exposure of said film to compensate for said change in light intensity.

6. An automatic exposure system for adjusting the light exposure of a film in accordance with varying light conditions comprising, in combination: light responsive means for providing a sensing signal constituting a function of the intensity of light passing to said film; light exposure adjusting means to vary the light exposure of said film; actuator means coupled to actuate said light exposure adjusting means in response to said sensing signal; an actuator control circuit connected to receive said sensing signal and provide a control signal constituting, at least in part, a function of said sensing signal, said actuator means being connected to be actuated by said control signal, said actuator control circuit including: a linearizing circuit connected to receive said sensing signal and linearize said signal so that 100% changes in the linearized signal occur for each exposure stop defined by said light exposure adjusting means; a summing junction point at the output of said linearizing circuit connected to receive and algebraically add said feedback signal to said linearized signal; and converting means for transforming the sum signal appearing at said junction point into a series of pulses occurring at a given frequency in which the width of each pulse is a function of the magnitude of said sum signal, said series of pulses constituting said output signal whereby heat dissipation in utilizing said control signal from said converting means for actuating said actuator means is minimized, and whereby a change in said sensing signal in response to a change in light intensity results in a change in said light exposure adjusting means to vary the light exposure of said film to compensate for said change in light intensity, said actuator control circuit further including means for providing a feedback signal responsive to movement of said actuator means so that said control signal is maintained at a constant value by said feedback signal when said light exposure adjusting means has been actuated to effect proper compensation for said change in light intensity.

7. A system according to claim 6, in which said converting means includes: a given signal source; a first differential amplifier receiving said sum signal and a given signal from said source to provide a difference signal; a saw tooth generator; and a second differential amplifier receiving a saw tooth signal from said saw tooth generator and said difference signal to provide said series of pulses.

8. A system according to claim 6, in which said actuator means comprises a solenoid actuator including an armature disposed in a magnetic field and having a winding; and a diode connected across said winding for maintaining substantially uniform current flow through said winding when receiving said series of pulses.

References Cited

UNITED STATES PATENTS

| | | | |
|---|---|---|---|
| 3,086,434 | 4/1963 | Edelstein | 352–141 XR |
| 3,143,046 | 8/1964 | Pennock et al. | 352–141 XR |
| 2,175,046 | 10/1939 | Warner | 324—132 |
| 2,885,471 | 5/1959 | King | 352—141 |
| 3,005,952 | 10/1961 | Basinger | 324—132 |
| 3,117,504 | 1/1964 | Steisslinger | 352—141 |
| 3,130,365 | 4/1964 | Minter | 324—132 |
| 3,205,803 | 9/1965 | Burgarella et al. | 95—10 |
| 3,230,847 | 1/1966 | Gregory et al. | 95—10 |
| 3,277,803 | 11/1966 | Fukuoka | 352—141 |
| 3,313,224 | 4/1967 | Biedermann | 95—10 |
| 3,363,967 | 1/1968 | Schmitt | 352—141 |

FOREIGN PATENTS 83,912  7/1920  Austria.

J. F. PETERS, Jr., Assistant Examiner

NORTON ANSHER, Primary Examiner

U.S. Cl. X.R.

96—10; 250—229; 318—115, 313; 352—216